(12) United States Patent
Cimatti

(10) Patent No.: US 9,255,613 B2
(45) Date of Patent: Feb. 9, 2016

(54) NORMALLY CLOSED AUTOMOTIVE CLUTCH WITH HYDRAULIC DRIVE

(71) Applicant: Ferrari S.p.A., Modena (IT)

(72) Inventor: Franco Cimatti, Pavullo (IT)

(73) Assignee: Ferrari S.p.A. (IT)

( * ) Notice: Subject to any disclaimer, the term of this patent is extended or adjusted under 35 U.S.C. 154(b) by 134 days.

(21) Appl. No.: 14/074,170

(22) Filed: Nov. 7, 2013

(65) Prior Publication Data
US 2014/0124322 A1    May 8, 2014

(30) Foreign Application Priority Data

Nov. 7, 2012  (IT) .............................. BO2012A0611

(51) Int. Cl.
| F16D 25/0638 | (2006.01) |
| F16D 43/28 | (2006.01) |
| F16D 25/08 | (2006.01) |

(52) U.S. Cl.
CPC .......... *F16D 25/0638* (2013.01); *F16D 25/082* (2013.01); *F16D 25/083* (2013.01)

(58) Field of Classification Search
CPC . F16D 25/0638; F16D 25/082; F16D 25/083; F16D 2121/06; F16D 2125/06
USPC .................................. 192/85.37, 85.57, 85.38
See application file for complete search history.

(56) References Cited

U.S. PATENT DOCUMENTS

| 3,016,121 A | * | 1/1962 | Mosbacher | ................. 192/85.37 |
| 4,245,724 A | * | 1/1981 | Beck | .............................. 188/170 |
| 5,947,247 A | * | 9/1999 | Cummings, III | .......... 192/70.12 |
| 6,142,280 A | * | 11/2000 | Koike | ......................... 192/85.25 |

FOREIGN PATENT DOCUMENTS

| EP | 1696147 A1 | 8/2006 |
| JP | 59-226719 A | 12/1984 |
| JP | 04-73429 A | 3/1992 |

OTHER PUBLICATIONS

"Italian Application Serial No. IT BO20120611, Search Report dated Jul. 10, 2013", 6 pgs.

* cited by examiner

*Primary Examiner* — James Pilkington
*Assistant Examiner* — Tinh Dang
(74) *Attorney, Agent, or Firm* — Schwegman Lundberg & Woessner, P.A.

(57) ABSTRACT

A normally closed automotive clutch with hydraulic drive and having: a stack of driven and driving plates, which are mounted so as to rotate around a rotation axis; a pressure ring, which is mechanically coupled to the stack of plates and can axially slide so as to axially compress the stack of plates; at least one elastic closing element, which presses the pressure ring; a hydraulic actuator comprising an inner actuation chamber, which is suited to be filled with a fluid under pressure so as to generate an opening thrust, and a sliding piston, which is coupled to the inner actuation chamber and is mechanically connected to the pressure ring; and a box, which is provided with a lateral lid and houses the stack of plates, the pressure ring, the elastic closing element, and the hydraulic actuator.

16 Claims, 4 Drawing Sheets

NORMALLY CLOSED AUTOMOTIVE CLUTCH WITH HYDRAULIC DRIVE

RELATED APPLICATION

This application claims the benefit of priority, under U.S.C. Section 119, to Italian Patent Application Serial No. BO2012A 000611, filed Nov. 7, 2012, which is incorporated herein by reference in its entirety.

TECHNICAL FIELD

The present invention relates to a normally closed automotive clutch with hydraulic drive.

PRIOR ART

The clutch control generates a closing thrust to keep one or more friction plates compressed and thus allow the transmission of torque through the clutch (clutch closed); furthermore, the clutch control generates an opening thrust to separate the friction plates, and thus cancel out the transmission of torque through the clutch (open clutch).

The clutch control may be of the normally closed type, i.e. the clutch is closed in absence of external actions (e.g. when the engine is stopped and the vehicle is parked). In this case, the control generates the closing thrust by means of one or more closing springs (the elastic force of which is permanent) and generates the opening thrust by means of a single-acting actuator which works against the bias of the closing springs. The clutch control is thus active in the opening direction (in which the actuator works) and passive in the closing direction (in which the closing springs work). This configuration allows to use the clutch also as parking brake for locking the vehicle when the engine is off.

Alternatively, the clutch control may be of the normally open type, i.e. the clutch is open in absence of external actions (e.g. when the engine is stopped and the vehicle is parked). In this case, the control exploits a source of energy (normally, hydraulic pressure) to hold the clutch closed while traveling, whereas it opens when the energy is cut off. This configuration is normally present in multi-clutch devices to prevent energy supply faults from closing all the clutches with consequent damage to the driveline and/or situations of danger for vehicle operation. However, in this configuration the hydraulic actuator is normally revolving and thus complex to build. Furthermore, in this configuration, the normal open clutch cannot be used as parking brake to lock the vehicle with the engine off, and an external parking brake device is therefore needed. Finally, a normally open clutch consumes energy while the vehicle is traveling to maintain the clutch closed, and is thus not very efficient from the energy point of view.

DESCRIPTION OF THE INVENTION

It is the object of the present invention to provide a normally closed automotive clutch with hydraulic drive which is free from the drawbacks described above, is at the same time easy and cost-effective to make, and in particular has high dynamic performance for both opening and closing.

A normally closed automotive clutch with hydraulic drive is provided, as disclosed in the appended claims.

BRIEF DESCRIPTION OF THE DRAWINGS

The present invention will now be described with reference to the accompanying drawings, which show a non-limitative embodiment thereof, in which.

PREFERRED EMBODIMENTS OF THE INVENTION

Figure 1:
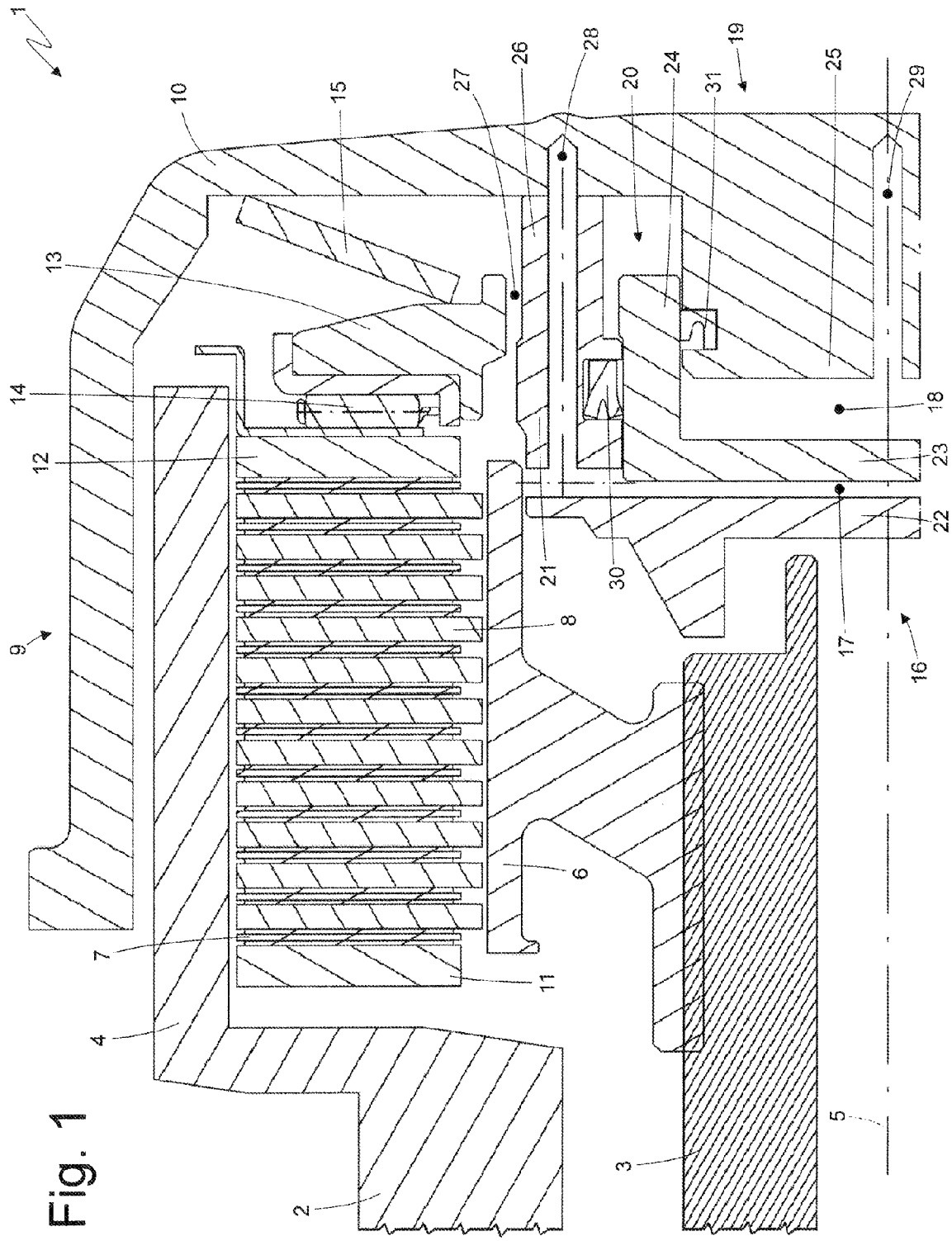
FIG. 1 is a longitudinal section view with parts removed for clarity of part of a normally closed automotive clutch with hydraulic drive made in accordance with the present invention.

In FIG. 1, reference numeral 1 indicates as a whole a wet multiplate clutch which is interposed between a driving shaft 2 (or inlet shaft) and a driven shaft 3 (or outlet shaft).

The clutch 1 comprises a bell 4 which is fitted in rotational manner about a longitudinal rotation axis 5 and is angularly integral to the driving shaft 2, and a hub 6 which is rotationally mounted about the longitudinal rotation axis 5, is arranged inside and coaxially to the bell 4 and is angularly integral to the driven shaft 3. A stack of plates consisting of a plurality of driving plates 7 angularly integral to the bell 4 and of a plurality of driven plates 8 intercalated between the driving plates 7 and angularly integral to the hub 6 is housed in the bell 4.

The bell 4, the plates 7 and 8, and the hub 6 are housed in a box 9 provided with a lateral lid 10 which is arranged on an end opposite to the shafts 2 and 3. The shafts 2 and 3 are rotationally mounted in the box 9 by interposing bearings (not shown).

The stack of plates 7 and 8 is positioned between two holding plates 11 and 12, which are arranged at the two opposite ends of the stack of plates 7 and 8 and are supported by the bell 4 (i.e. are angularly integral to the bell 4). The holding plate 11 is rigidly mounted to the bell 4 (i.e. is fixed with respect to the bell 4), while the holding plate 12 is mounted in axially sliding manner to the bell 4 to translate axially with respect to the bell 4 itself; in this manner, the holding plate 12 can slide axially with respect to the bell 4 to move towards/away from the holding plate 11 and thus compress/release the stack of plates 7 and 8. It is worth noting that the stack of plates 7 and 8 is positioned between two retaining plates 11 and 12 angularly integral to the bell 4; consequently, two driving plates 7, which are angularly integral to the bell 4, and thus turns synchronously (consequently without sliding) with the holding plates 11 and 12, are present on the outer ends of the stack of plates 7 and 8.

The clutch 1 is provided with pressure ring 13, which is mechanically coupled to the holding plate 12 to press on the holding plate 12 itself and is mounted in axially sliding manner to the lid 10 of the box 9 to shift axially (i.e. along the rotation axis 5) and thus vary the pressure exerted on the holding plate 12 between a zero value (no pressure, i.e. the stack of plates 7 and 8 is completely released and no torque is transmitted, thus the clutch is completely open) and a maximum value (maximum pressure, i.e. the stack of plates 7 and 8 is completely pressed and transmits maximum torque and thus the clutch is completely closed). The pressure ring 13 is carried in axially sliding manner by the lid 10 of the box 9 and thus does not turn; consequently, a plurality of axial thrust bearings 14 (only one of which is shown in FIG. 1) are interposed between the pressure ring 14 and the holding plate 12 which allow the pressure ring 13 (which does not rotate) to press on the holding plate 12 (which rotates integrally to the bell 4) without significant friction. In use, the pressure ring 13 is moved axially (i.e. parallel to rotation axis 5) to press on the plates 7 and 8, and thus stack the plates 7 and 8 against one another to determine the torque transmission between the plates 7 and 8.

The clutch 1 comprises a closing spring 15, which is interposed (compressed) between the lid 10 of the box 9 and the pressure ring 13, and constantly pushes on the pressure ring 13 to apply a constant elastic thrust which tends to press the plate stack 7 and 8 and thus maintain the clutch 1 closed on the pressure ring 13. Consequently, without further actions, the closing spring 15 maintains the clutch 1 closed and thus the clutch 1 is normally closed.

The clutch 1 comprises a double-acting hydraulic actuator 16 which is directly integrated in the lid 10 of the box 9 (i.e. is completely supported by the lid 10) and is suited to be activated in one sense to impress an axial opening thrust on the pressure ring 13 (shown in FIG. 2), which is opposite to the elastic thrust generated by the closing spring 15, and to be activated in a second sense to impress an axial closing thrust on the pressure ring 13 (shown in FIG. 3) which agrees with the elastic thrust generated by the closing spring 15.

The hydraulic actuator 16 comprises two actuation chambers 17 and 18 which are mutually concentric, are obtained one by the side of the other and partially within each other at a central portion 19 of the lid 10, and are mutually separated by a sliding piston 20. The sliding piston 20 is an integral part of the press ring 13 and has a "U"-shape in longitudinal section (i.e. the sliding piston 20 is cup-shaped); in other words, the sliding piston 20 belongs to the pressure ring 13 and seamlessly constitutes a central part of the pressure ring 13 itself (from another point of view, the sliding piston 20 consists of a central part of the pressure ring 13). The inner actuation chamber 17 (which is suited to generate the axial opening thrust) is laterally delimited by a lateral wall 21 with an annular shape, which is rigidly connected to the central portion 19 of the lid 10 and is delimited on the two opposite ends by a bottom wall 22 with a circular shape integral to the lateral wall 21 and by a bottom wall 23 with a circular shape of the sliding piston 20. The outer actuation chamber 18 (which is suited to generate the axial closing thrust) partially arranged within the inner actuation chamber 17, is laterally delimited by a lateral wall 24 with an annular shape belonging to the sliding piston 20, and is delimited on the two opposite ends by the bottom wall 23 with a circular shape belonging to the piston 20 and by a bottom wall 25 of circular shape belonging to the central portion 19 of the lid 10.

The lateral wall 21 with an annular shape is rigidly connected to the central portion 19 of the lid 10 by means of a series of stud bolts 26 (only one of which is shown in FIG. 1) which are arranged axially and pass through corresponding axial through holes 27 (only one of which is shown in FIG. 1) obtained through the pressure ring 13. In other words, each stud bolt 26 has an outer end integral to the central portion of the lid 10 and an inner end integral to the lateral wall 21.

The inner actuation chamber 17 is filled with a fluid under pressure or said fluid under pressure is emptied out of said inner actuation chamber 17 through a feeding duct 28, which is obtained through a stud bolt 26 and then through the lateral wall 21, while the inner actuation chamber 17 is filled with a fluid under pressure or said fluid under pressure is emptied out of said inner actuation chamber 17 through a feeding duct 29, which is obtained through the bottom wall 25 belonging to the central portion 19 of the lid 10.

Figure 4:
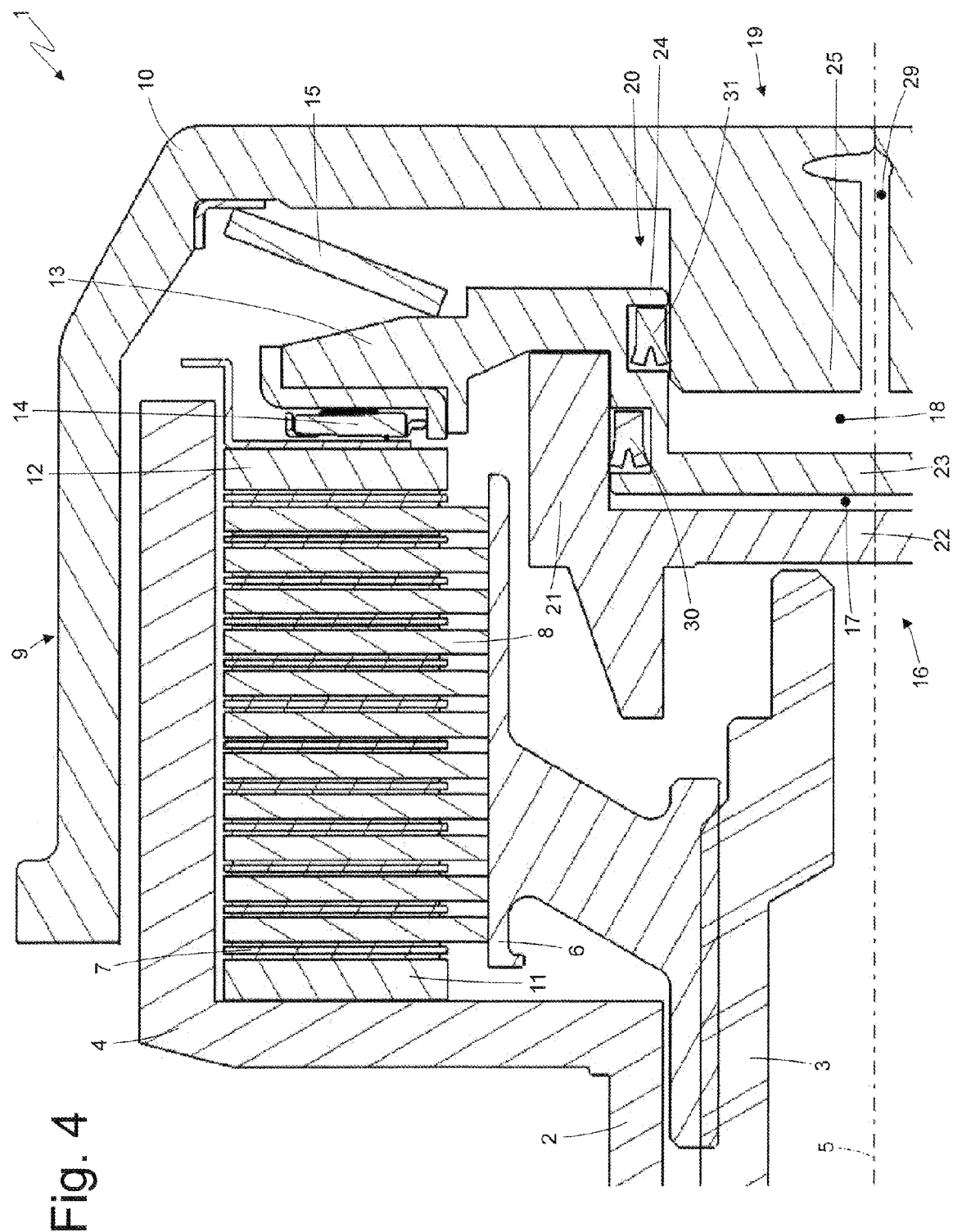
FIG. 4 is a longitudinal section view, with parts removed for clarity, of a variant of the clutch in FIG. 1.

The inner actuation chamber 17 is sealed in a fluid-tight manner by means of an inner sealing gasket 30 housed in a seat obtained in the lateral wall 21, while the outer actuation chamber 18 is sealed in fluid-tight manner by means of an annular sealing gasket 31 housed in a seat obtained in the bottom wall 25 of the lid 10. In the variant shown in FIG. 4, both annular sealing gaskets 30 and 31 are housed in corresponding seats obtained in the annular shape lateral wall 24 belonging to the sliding piston 20.

It is worth noting that the diameter of the inner actuation chamber 17 is greater than the diameter of the outer actuation chamber 18, thus the fluid pressure being equal, the opening thrust (shown in FIG. 2) generated by the inner actuation chamber 17 is greater than the closing thrust (shown in FIG. 3) generated by the outer actuation chamber 18. Such a difference between the two thrusts is certainly not negative because the opening thrust must also overcome the elastic force generated by the closing spring 15, and thus must be greater, while the closing thrust is assisted by the elastic force generated by the closing spring 15, and thus may be smaller. In essence, the overall effects of the two thrusts on the pressure ring could be identical if the difference between the force generated by the opening thrust and the force generated by the closing thrust were double the elastic force generated by the closing spring 15.

By virtue of the fact that the hydraulic actuator is of the double-acting type, the elastic force generated by the closing spring 15 may be relatively low, because it must be dimensioned only to guarantee the complete closing of the clutch 1 in absence of external interventions (i.e. when the actuation chambers 17 and 18 are empty or in all cases not under pressure). Indeed, the dynamic pressure of the clutch 1 during closing (i.e. a suitable closing speed) is guaranteed by the closing thrust generated by the hydraulic actuator (in particular, by filling the outer actuation chamber 18 with fluid under pressure) in manner essentially independent from the elastic force generated by the closing spring 15.

The operation of the clutch 1 is described below.

When the hydraulic actuator 16 is deactivated, i.e. when the two actuation chambers 17 and 18 are empty or in all cases not under pressure, the elastic force generated by the closing spring 15 pressing on the pressure ring 13 maintains the clutch 1 in an all closed position.

Figure 2:
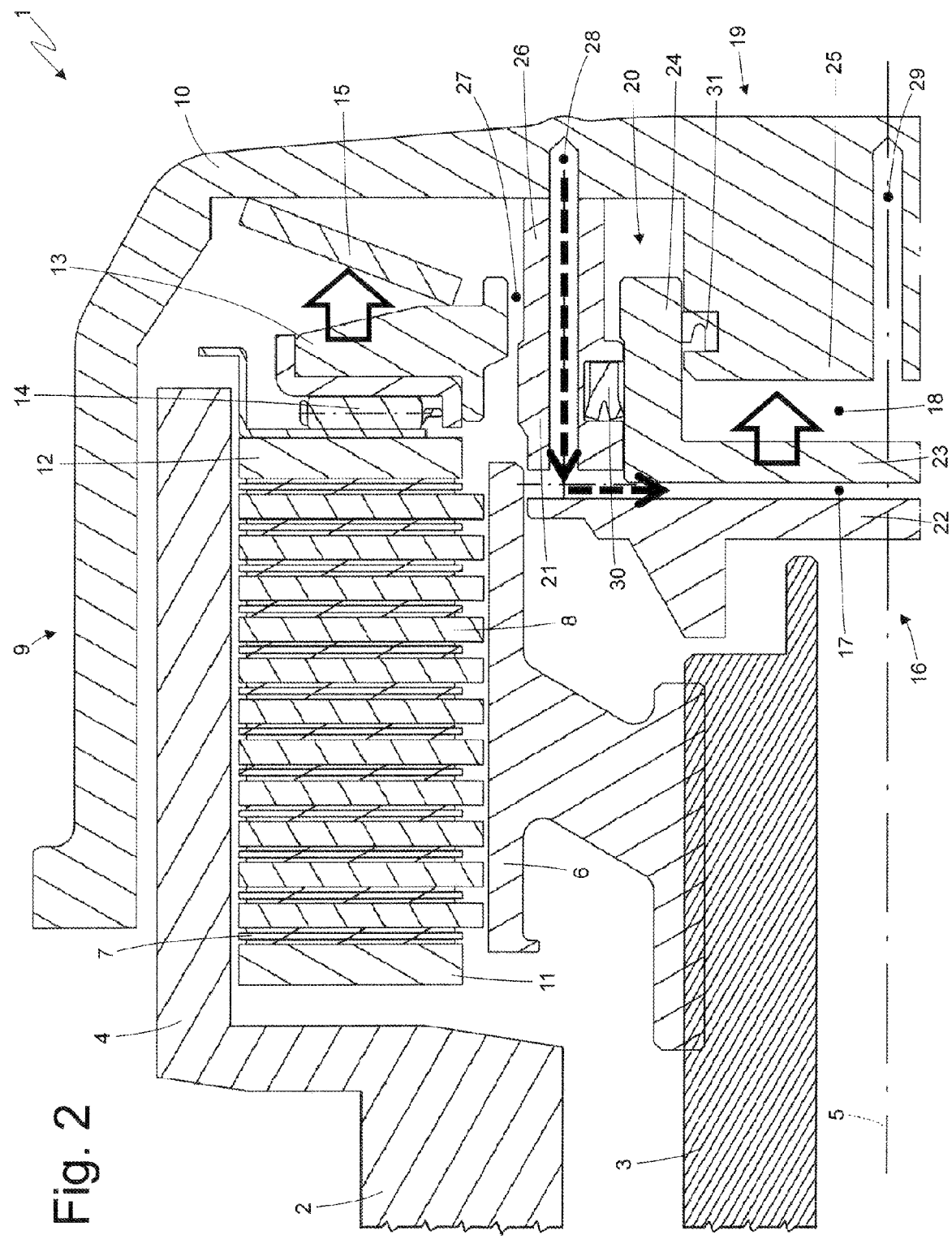
FIG. 2 is a longitudinal section view and with parts removed for clarity of the clutch in FIG. 1 with the flows of fluid under pressure during the opening maneuver highlighted.

As shown in FIG. 2, when the inner actuation chamber 17 is filled with a fluid under pressure by means of the feeding duct 28, the hydraulic actuator 16 generates on the sliding piston 20, and thus on the pressure ring 13 which integrates the sliding piston 20, an axial thrust, which is contrary to the elastic force generated by the closing spring 15 and by overcoming the elastic force generated by the closing spring 15 moves the clutch 1 from the closing position to an opening position.

Figure 3:
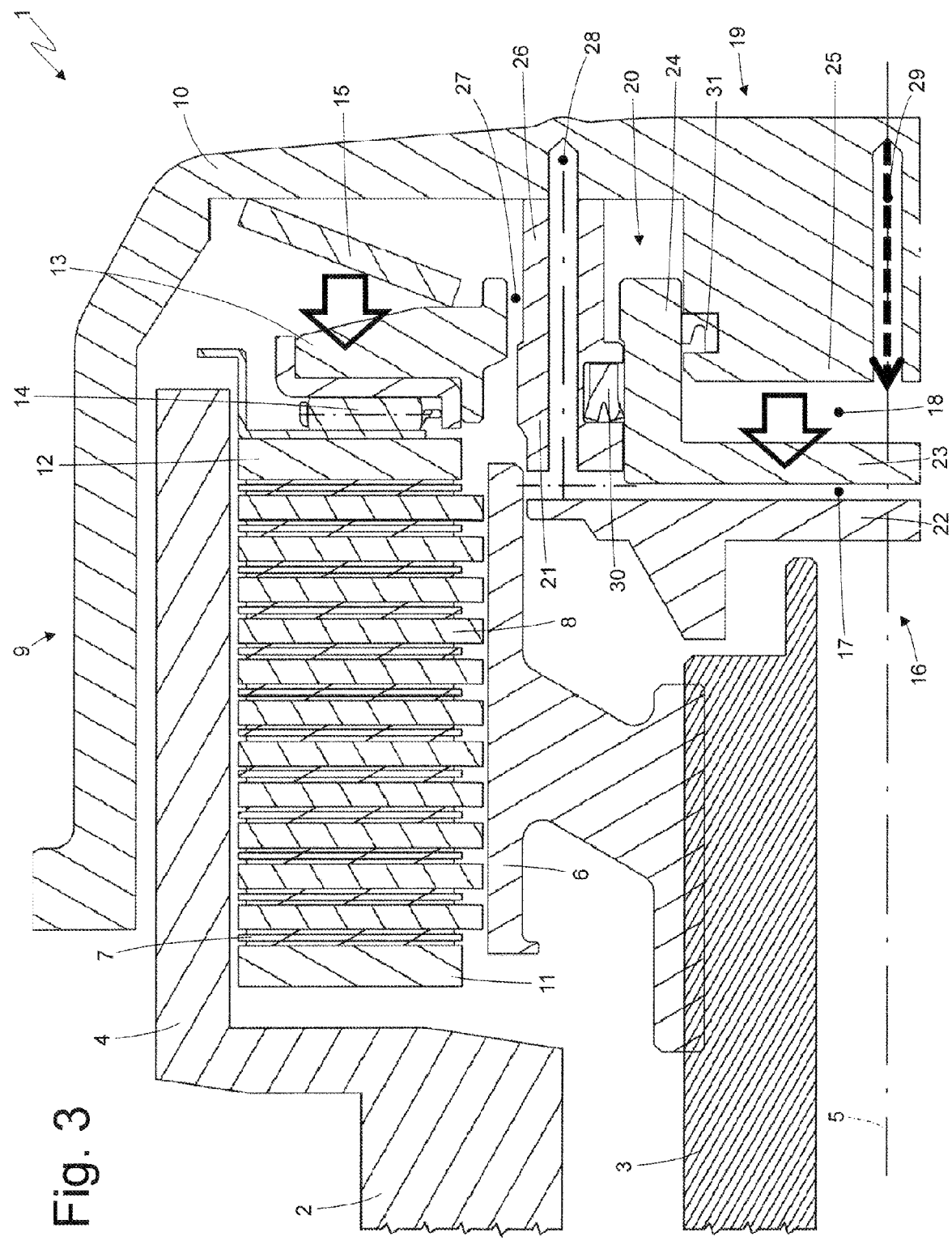
FIG. 3 is a longitudinal section view and with parts removed for clarity of the clutch in FIG. 1 with the flows of fluid under pressure during the closing maneuver highlighted.

As shown in FIG. 3, when the outer actuation chamber 18 is filled with a fluid under pressure by means of the feeding duct 29, the hydraulic actuator 16 generates on the sliding piston 20, and thus on the pressure ring 13 which integrates the sliding piston 20, an axial thrust, which agrees with the elastic force generated by the closing spring 15 and moves the clutch 1 from the opening position towards a closing position.

By way of example only, the particular shape of the plates 7 and 8 is referred to a single wet clutch 1 in which the bell 4 is angularly integral to the driving plates 7 (thus to the driving shaft 2), while the hub 6 is angularly integral to the driven plates 8 (thus to the driven shaft 3); obviously according to a construction variant, the bell 4 may be angularly integral to the driven plates 8 (thus to the driven shaft 3), while the hub 6 could be angularly integral to the driving plates 7 (thus to the driving shaft 2).

The clutch 1 described above has many advantages.

Firstly, the clutch 1 described above is simple and cost-effective to make because the hydraulic actuator 16 is entirely integrated in the lid 10 of the box 9; consequently, the hydraulic actuator 16 is completely assembled outside the clutch 1 and is coupled to the clutch 1 only at the last moment, simply by mounting the lid 10 to the box 9.

In the clutch 1 described above the hydraulic actuator 16 is of the double-acting type and thus allows to actively control the response speed of the control in both directions (i.e. both opening and closing) guaranteeing complete, optimal controllability of the clutch 1, i.e. allowing high dynamic performance both when opening and closing.

In the clutch 1 described above, the entire hydraulic actuator 16 and the closing spring 15 do not rotate and thus their construction is greatly simplified.

In the clutch 1 described above, the diameters of the two actuation chambers 17 and 18 are differentiated to compensate for the asymmetric action of the closing spring 15 (the opening thrust generated by the actuation chamber 17 must overcome the load of the closing spring 15 during opening, while the closing thrust generated by the actuation chamber 18 is added to the load of the closing spring 15 when closing); consequently, the two actuation chambers 17 and 18 of the hydraulic actuator 16 can be supplied by a single source of fluid under pressure (i.e. the two actuation chambers 17 and 18 of the hydraulic actuator 16 may act with the same control pressure).

In the clutch 1 described above, the hydraulic actuator 16 is particularly compact, because it has an extremely small axial dimension (i.e. measured along rotation axis 5).

In brief, the clutch 1 described above combines actuation speed and controllability with double-acting hydraulic drive, typical of normally open clutches, with the efficiency and constructive simplicity of normally closed clutches (which do not require energy while traveling to maintain the clutch closed, do not require a separate parking brake device and do not have a rotating hydraulic control part).

The invention claimed is:

1. A normally closed automotive clutch with hydraulic drive; the clutch comprises:
    a stack of driven and driving plates, which are mounted so as to rotate around a rotation axis;
    a pressure ring mechanically coupled to the stack of plates and axially slidable to axially compress the stack of plates to vary the torque transmitted to the clutch;
    at least one elastic closing element operable to press against the pressure ring to axially push the pressure ring against the stack of plates;
    a hydraulic actuator having:
        an inner actuation chamber adapted to receive a pressurized fluid for generating an opening thrust,
        a sliding piston coupled to the inner actuation chamber and mechanically connected to the pressure ring, and
        an outer actuation chamber coupled to the sliding piston opposite the inner actuation chamber and adapted to receive a pressurized fluid for generating a closing thrust,
        wherein the hydraulic actuator is a double-acting actuator; and
    a box having a lateral lid and housing the stack of plates, the pressure ring, the elastic closing element, and the hydraulic actuator;
    wherein the inner actuation chamber is integral to a central portion of the lid and is laterally delimited by a first lateral wall having an annular shape, the first lateral wall being rigidly connected to the central portion of the lid and is delimited, at opposing ends, by a first bottom wall having a circular shape integral to the first lateral wall, and by a second bottom wall of the sliding piston having a circular shape; and
    wherein the sliding piston is integral to the pressure ring and defines a central part of the pressure ring.

2. The clutch of claim 1, wherein the hydraulic actuator is integrated into the lid of the box.

3. The clutch of claim 1, wherein the first lateral wall has an annular shape and is rigidly connected to the central portion of the lid by a series of stud bolts, the stud bolts are axially arranged and extend through corresponding holes in the pressure ring.

4. The clutch of claim 3, wherein the inner actuation chamber is adapted to receive a pressurized fluid and evacuate the pressurized fluid said inner actuation chamber through feeding duct defined is a stud bolt extending through the first lateral wall.

5. The clutch of claim 1, wherein the inner actuation chamber comprises an annular sealing gasket for providing a fluid tight seal and positioned in a seat defined in at least one of the third bottom first lateral wall and a second lateral wall having an annular shape corresponding to the sliding piston.

6. The clutch of claim 1, wherein the two actuation chambers are arranged concentrically and adjacently, wherein a portion of one of the actuation chambers is positioned within the other actuation chamber corresponding to the central portion of the lid, wherein the acutation chambers are separated by the sliding piston.

7. The clutch of claim 1, wherein the outer actuation chamber is laterally delimited by a second lateral wall having an annular shape corresponding to the sliding piston, and is delimited, at opposing ends, by the second bottom wall having a circular shape corresponding to the sliding piston and by a third bottom wall with a circular shape corresponding to the central portion of the lid.

8. The clutch of claim 7, wherein the inner actuation chamber adapted to receive a pressurized fluid and evacuate the fluid from said inner actuation chamber through a feeding duct extending through the third bottom wall of the central portion of the lid.

9. The clutch of claim 7, wherein the outer actuation chamber comprises an annular sealing gasket for providing a fluid tight seal and positioned in a seat defined in at least one of the third bottom wall and the second lateral wall having an annular shape corresponding to the sliding piston.

10. The clutch of claim 1, wherein the sliding piston is cup-shaped.

11. The clutch of claim 1, wherein the elastic closing element is interposed between the lid of the box and the pressure ring, the elastic closing element applies constantly pressure to the pressure ring.

12. The clutch of claim 1, wherein:
    the stack of plates is positioned between two holding plates, the two holding plates are positioned at opposing ends of the stack of plates and are supported by a bell; and
    the pressure ring is mechanically connected to a holding plate and is slidably mounted on the lid of the box such the pressure ring to movable axially to press the holding plate.

13. The clutch of claim 12, wherein a plurality of axial thrust bearings are interposed between the pressure ring and the holding plate.

14. A normally closed automotive clutch with hydraulic drive; the clutch comprises:
   a stack of driven and driving plates, which are mounted so as to rotate around a rotation axis;
   a pressure ring mechanically coupled to the stack of plates and axially slidable to axially compress the stack of plates to vary the torque transmitted to the clutch;
   at least one elastic closing element operable to press against the pressure ring to axially push the pressure ring against the stack of plates;
   a hydraulic actuator having an inner actuation chamber adapted to receive a pressurized fluid for generating an opening thrust, and a sliding piston coupled to the inner actuation chamber and mechanically connected to the pressure ring; and
   a box having a lateral lid and housing the stack of plates, the pressure ring, the elastic closing element, and the hydraulic actuator;
   wherein the inner actuation chamber is integral to a central portion of the lid and is laterally delimited by a first lateral wall having an annular shape, the first lateral wall having an annular shape and being rigidly connected to the central portion of the lid by a series of stud bolts, the stud bolts being axially arranged and extend through corresponding holes in the pressure ring, the first lateral wall being delimited, at opposing ends, by a first bottom wall having a circular shape integral to the first lateral wall, and by a second bottom wall of the sliding piston having a circular shape; and
   wherein the sliding piston is integral to the pressure ring and defines a central part of the pressure ring.

15. The clutch of claim 14, wherein the inner actuation chamber is adapted to receive a pressurized fluid and evacuate the pressurized fluid from said inner actuation chamber through a first feeding duct defined in a stud bolt extending through the first lateral wall.

16. A normally closed automotive clutch with hydraulic drive; the clutch comprises:
   a stack of driven and driving plates, which are mounted so as to rotate around a rotation axis, wherein the stack of plates is positioned between two holding plates positioned at opposing ends of the stack of plates and are supported by a bell, wherein a plurality of axial thrust bearings are interposed between the pressure ring and the holding plate;
   a pressure ring mechanically coupled to at least one holding plate of the stack of plates and axially slidable to axially compress the stack of plates to vary the torque transmitted to the clutch;
   at least one elastic closing element operable to press against the pressure ring to axially push the pressure ring against the stack of plates;
   a hydraulic actuator having an inner actuation chamber adapted to receive a pressurized fluid for generating an opening thrust, and a sliding piston coupled to the inner actuation chamber and mechanically connected to the pressure ring; and
   a box having a lateral lid and housing the stack of plates, the pressure ring, the elastic closing element, and the hydraulic actuator, the pressure ring slidably mounted on the lid of the box such that the pressure ring is movable axially to press the holding plate;
   wherein the inner actuation chamber is integral to a central portion of the lid and is laterally delimited by a first lateral wall having an annular shape, the first lateral wall being rigidly connected to the central portion of the lid and is delimited, at opposing ends, by a first bottom wall having a circular shape integral to the first lateral wall, and by a second bottom wall of the sliding piston having a circular shape; and
   wherein the sliding piston is integral to the pressure ring and defines a central part of the pressure ring.

* * * * *